Patented Sept. 22, 1953

2,653,105

UNITED STATES PATENT OFFICE 2,653,105

DIETETICALLY SWEETENED FOOD PRODUCTS AND METHOD OF PREPARING THE SAME

James B. Gordon, Burlingame, Calif.

No Drawing. Application December 8, 1952,
Serial No. 324,831

8 Claims. (Cl. 99—129)

This application is a continuation-in-part of my copending application, Serial No. 254,185, filed October 23, 1951 and entitled "Dietetic Food Product."

The present invention relates to dietetically sweetened food products and more particularly to dietetically sweetened preserves.

In my copending application, a novel method was disclosed for simultating a sugar-like taste in food products in general, without the use of sugar, and more particularly, canned fruit.

The present invention has, as its main object, the production of dietetically sweetened preserves including the usual jams and jellies which normally range in sugar concentrations from 65% to 70%.

In the past, it has been possible to sweeten various food products to a certain degree by using relatively low concentrations of saccharin which, although not producing a sugar-like taste, nevertheless has resulted in an acceptable product, especially in cases of persons who are willing to sacrifice the natural sweetness of sugar to reduce their bodily intake of carbohydrates.

However, in foods such as preserves which normally require a relatively large amount of sweetening, the use of saccharin alone has not been satisfactory because, upon increasing the concentration of saccharin to the point necessary to obtain the degree of sweetness required, a characteristic bitter or metallic taste results.

For example, when the concentration of saccharin is too great, a bitter taste is noticeable; although in the case of preserves the type of fruit employed will, to a great extent, affect the upper limit of the saccharin concentration. It will, therefore, be apparent that to prepare dietetic jams or jellies which normally require a high sugar concentration of from 65% to 70% the addition of saccharin itself will not be sufficient.

The problem of sweetening dietetic preserves without the use of sugar is further complicated by the fact that a wide range of acid content occurs in different fruits as well as a wide range of natural sugar content. Thus, grapes have a relatively high sugar and low acid content while berries tend to have a low sugar and high acid content. Even among different batches of the same fruit the sugar and acid content may vary appreciably.

It will therefore be apparent that the amount of sweetening added cannot be set forth with accuracy for all cases. The addition of a certain amount of saccharin may be sufficient to raise the sweetness of a relatively "low sugar" fruit without resulting in a bitter taste but, if the acid content of such fruit is relatively high, addition of saccharin alone may not be possible because its required concentration becomes excessive.

I have found that the sugar-like taste normally present in prepared fruit products may be very closely simulated by the use of a combination of sodium cyclamate or calcium cyclamate and saccharin in certain proportions.

However, it is important to note that "texture," being inseparably related to "taste" must also be considered when preparing dietetically sweetened food products and particularly dietetic preserves. In the conventional method of making jams and jellies, the desired thickening effect or "gel" is produced by adding pectin in certain known proportions provided the necessary percentage of acid is present. Pectin, of course, requires the presence of a considerable concentration of sugar and will not cause jelling without sugar.

Thus, in the case of dietetic foods such as preserves, pectin cannot be employed because no sugar is added.

When a combination of sodium cyclamate or calcium cyclamate and saccharin is employed to produce the desired sweetening effect in preserves, it is possible to achieve a gel by the use of a low methoxyl acid pectinate commonly caled "low methoxyl pectin."

In addition, it is necessary to adjust the pH value of the jelly to between 3 and 4 by the addition of citric acid, or any other edible acid such as tartaric, malic, acetic, etc. The exact amount of adjustment of the pH value will of course vary with the particular type of fruit employed.

In addition to the adjustment of the pH value, it is necessary to add calcium ion to bring the calcium ion concentration to at least 25 milligrams for each gram of low methoxyl pectin added. The addition of the calcium ion may be effected by almost any calcium salt such as calcium chloride, mono-calcium phosphate, di-calcium phosphate, calcium lactate, etc.

In the manufacture of most jams and jellies, it is desirable to enhance the sweetness by adding small percentages of saccharin. It must be understood in this connection that saccharin, being sweeter than either sodium or calcium cyclamate, is preferably employed in relatively small percentages to whatever extent possible. From the standpoint of economy, the sweetening effect of saccharin is used to good advantage because it is relatively inexpensive.

The concentration of calcium and sodium cyclamate is also limited and it has been found that concentrations in excess of 1.0% and 1.3% respectively will result in a bitter taste although not as unpalatable as the metallic taste characteristic of saccharin.

It is therefore apparent that both saccharin and calcium (or sodium) cyclamate have their limitations. That is, there is a percentage of concentration beyond which an unpalatable taste results although the disagreeable taste of one is not the same as that resulting from overuse of the other.

I have further found that the inherent unpalatable tastes of both saccharin and calcium and sodium cyclamate do not combine in the same manner as their sweetening effects. This phenomenon may be used to advantage in preparing most preserves which normally require a relatively large amount of added sugar.

A satisfactory formula employing sodium or calcium cyclamate and saccharin is as follows:

|  | Percent |
|---|---|
| Saccharin _____maximum__ | .032 |
| Sodium (or calcium) cyclamate_____do____ | .23 |
| Low methoxyl pectin_____do____ | 1.5 |
| Fruit (including fruit juice) and other ingredients _____minimum__ | 98.238 |

Depending upon the type of fruit employed and the sweetness desired, the above formula may be considerably varied. For example, under certain conditions the use of saccharin may be considerably increased and a concentration of over .1% may be employed when a relatively high sweetness is desired.

However, it is always desirable to employ sodium or calcium cyclamate to a greater extent than saccharin. Thus, although the concentration of sodium or calcium cyclamate may be reduced as low as .2% in some cases when no saccharin is necessary, a concentration of 1.0% calcium cyclamate or 1.3% sodium cyclamate may be considered as upper limits when saccharin is also employed. By maintaining the percentage of sodium cyclamate or calcium cyclamate at a substantially greater value than the percentage of saccharin, the undesirable bitter taste of such ingredient is not manifested.

For example, in the relatively rare cases where the percentage of saccharin is increased above .1%, the percentage of sodium or calcium cyclamate should be at least two or three times this amount with an upper limit of about .4%.

Obviously, when a relatively low degree of sweetness is desired, lesser amounts of saccharin should be employed and relatively greater amounts of sodium or calcium cyclamate. Thus with relatively low concentrations of saccharine, the addition of sodium or calcium cyclamate in amounts of ten or twelve times the saccharin content is possible as described in my copending application.

I claim:

1. The method of making dietetically sweetened preserves from fruit requiring a substantial amount of sweetening which comprises the steps of adding to said fruit saccharin, a material selected from sodium cyclamate and calcium cyclamate in an amount of from two to twenty-five times the saccharin content, and from .3% to 1.5% by weight of low methoxyl pectin.

2. The method of making dietetically sweetened preserves from fruit requiring a substantial amount of sweetening which comprises the steps of adding to said fruit saccharine, a material selected from sodium cyclamate and calcium cyclamate in an amount of from two to twenty-five times the saccharin content, and from .3% to 1.5% by weight of low methoxyl pectin, and thereafter adding edible acid to adjust the pH value of the resulting compound to between 3 and 4, and adding calcium ion to make the concentration of said ion at least 25 milligrams for each gram of low methoxyl pectin.

3. Dietetically sweetened preserves comprising fruit, low methoxyl pectin, saccharin in an amount less than .11% and a material selected from sodium cyclamate and calcium cyclamate in an amount at least equal to twice the saccharin content.

4. The method of sweetening a dietetic fruit product comprising, adding to said fruit product, saccharin in an amount less than .11% by weight and a material selected from calcium cyclamate and sodium cyclamate in an amount at least equal to twice the saccharin content.

5. The method of making dietetically sweetened preserves from fruit requiring a substantial amount of sweetening which comprises the steps of adding to said fruit saccharine, a material selected from sodium cyclamate and calcium cyclamate in an amount of from two to twenty-five times the saccharin content.

6. The method of sweetening a dietetic fruit product which comprises adding saccharin and a material selected from sodium cyclamate and calcium cyclamate in an amount from two to twenty-five times the saccharin content.

7. The method of sweetening a dietetic fruit product which comprises adding to said fruit product .02% to 1.3% by weight of a material selected from a group consisting of sodium cyclamate and calcium cyclamate, and saccharin in an amount less than .13%, with the concentration of said material being greater than the concentration of said saccharin.

8. The method of sweetening a fruit flavored product which comprises adding to said product .02% to 1.3% by weight of a material selected from sodium cyclamate and calcium cyclamate, and saccharin in an amount less than .13%, with the concentration of said material being greater than the concentration of said saccharin.

JAMES B. GORDON.

References Cited in the file of this patent

UNITED STATES PATENTS

| Number | Name | Date |
|---|---|---|
| 2,203,643 | Musher _____ | June 4, 1940 |
| 2,275,125 | Audrieth et al. _____ | Mar. 3, 1942 |
| 2,311,235 | Kuderman _____ | Feb. 16, 1943 |
| 2,536,970 | Weast _____ | Jan. 2, 1951 |